March 7, 1933. W. OWEN 1,900,583
APPARATUS FOR CASE HARDENING GLASS SHEETS
Filed March 18, 1932 4 Sheets-Sheet 2
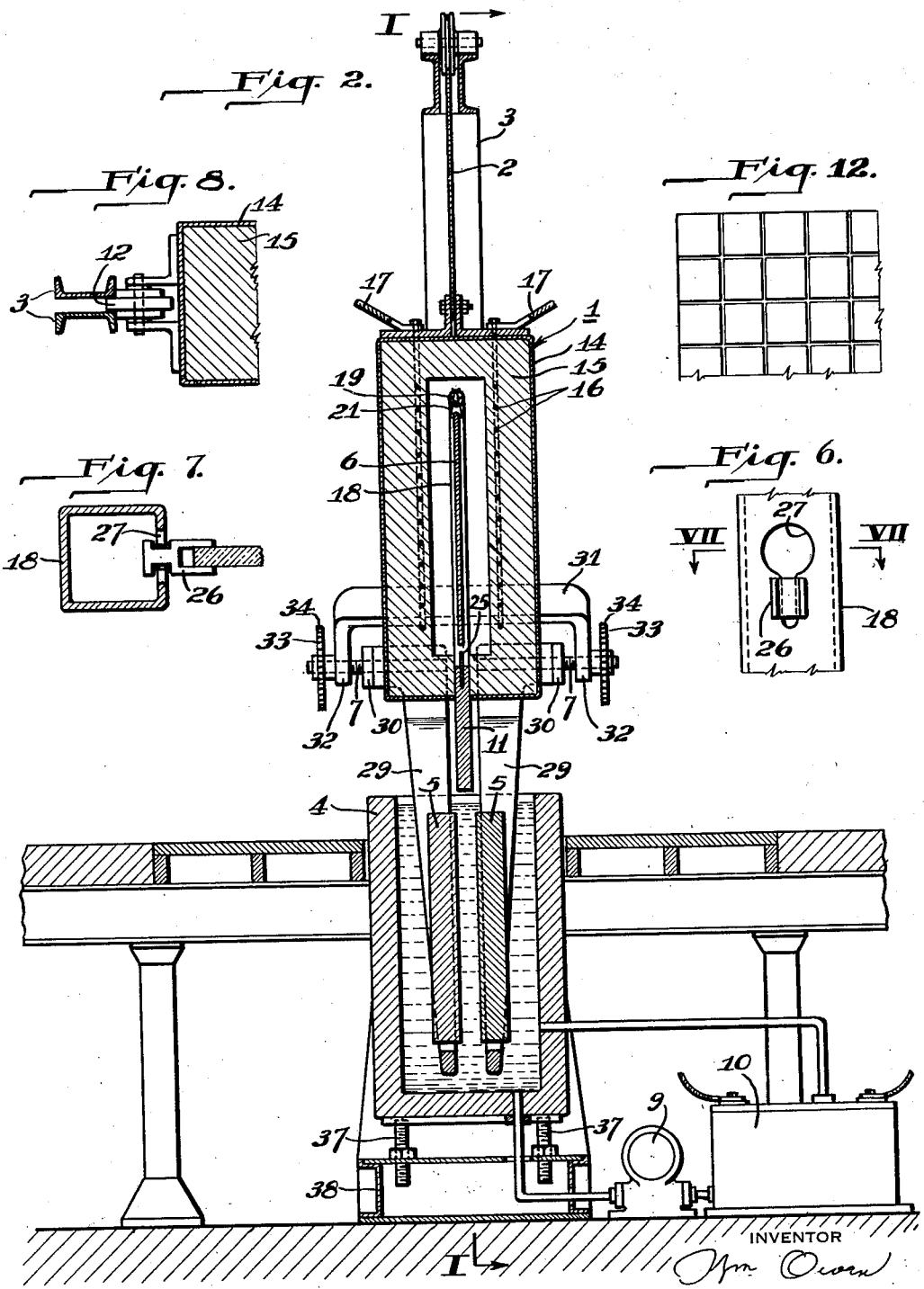
INVENTOR March 7, 1933.  W. OWEN  1,900,583
APPARATUS FOR CASE HARDENING GLASS SHEETS
Filed March 18, 1932  4 Sheets-Sheet 3
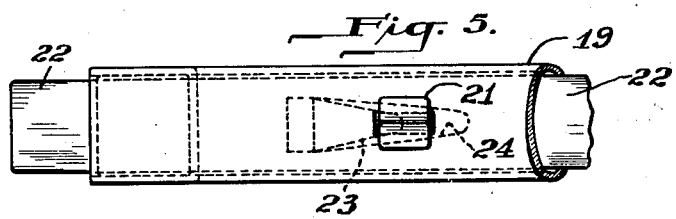
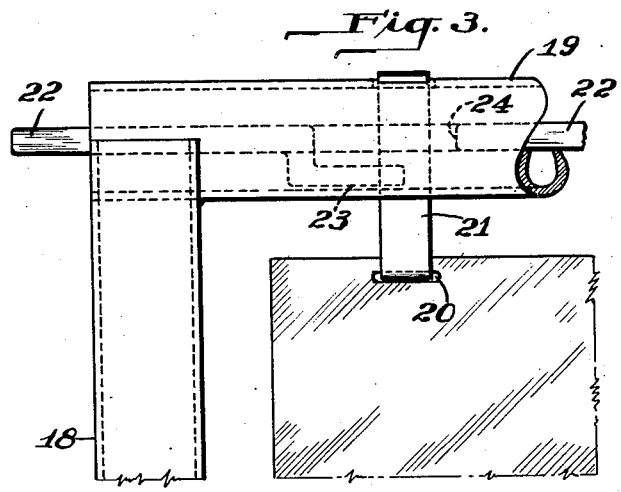
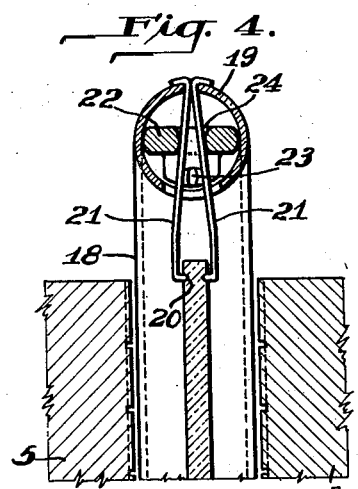
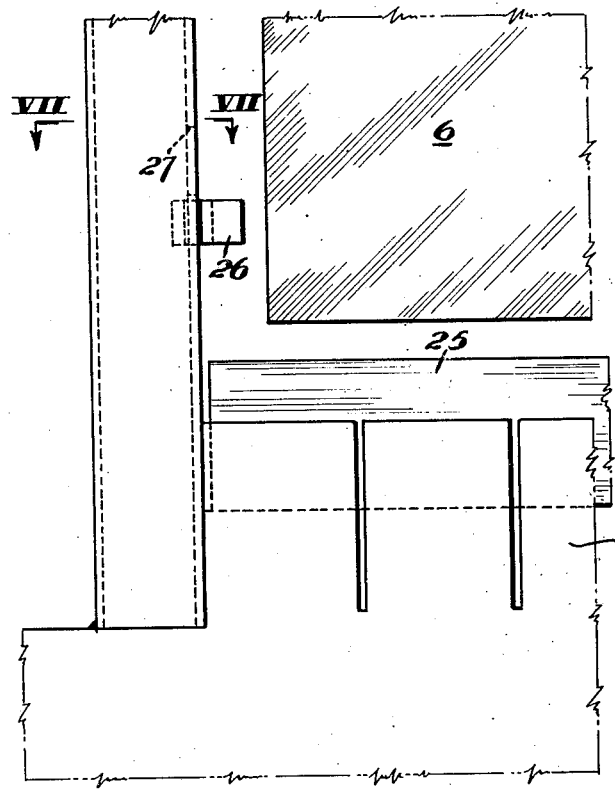
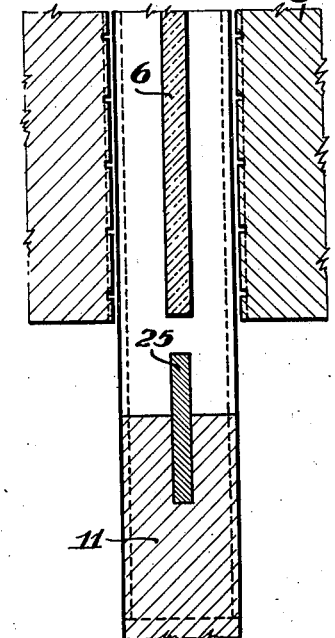
INVENTOR

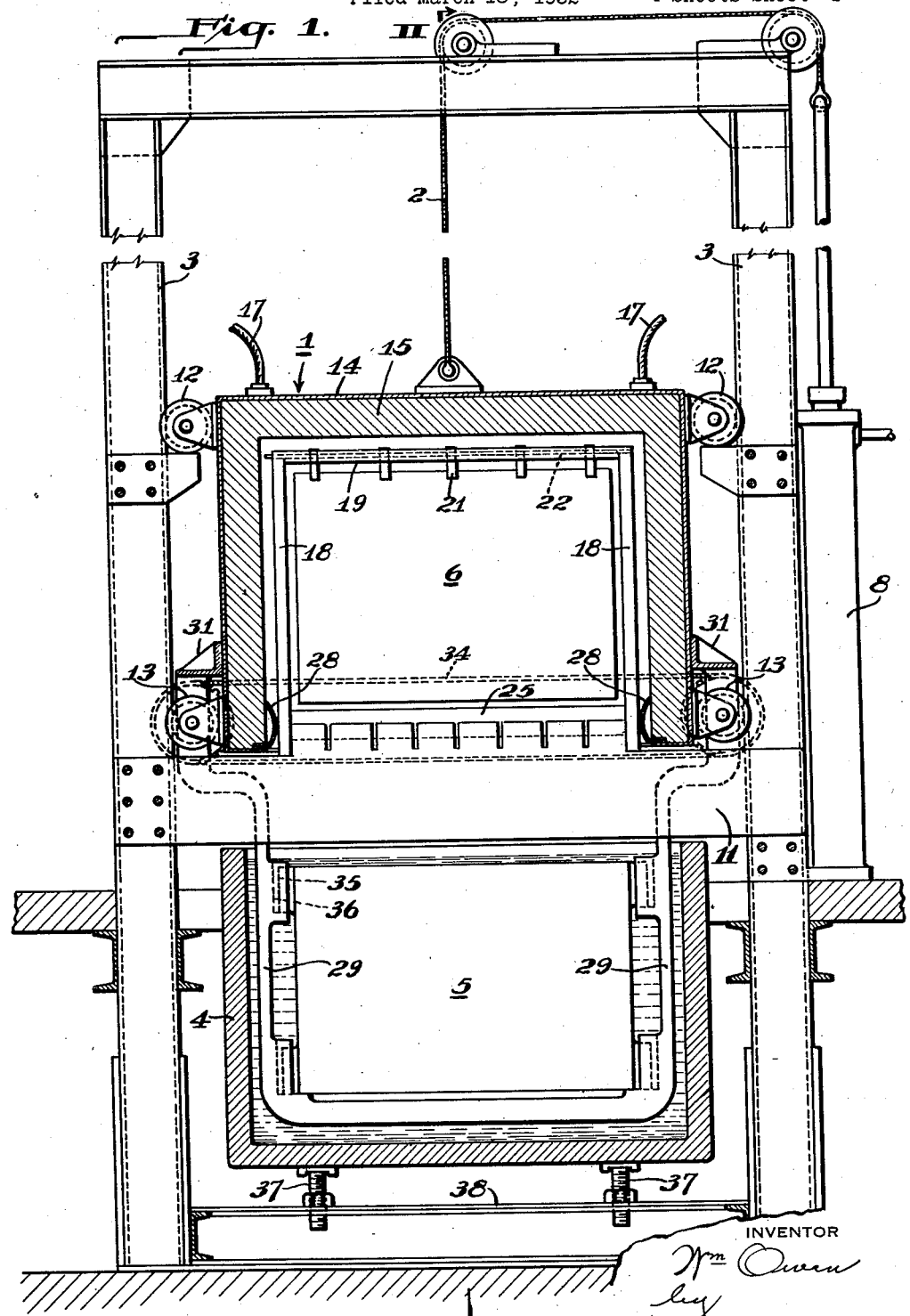

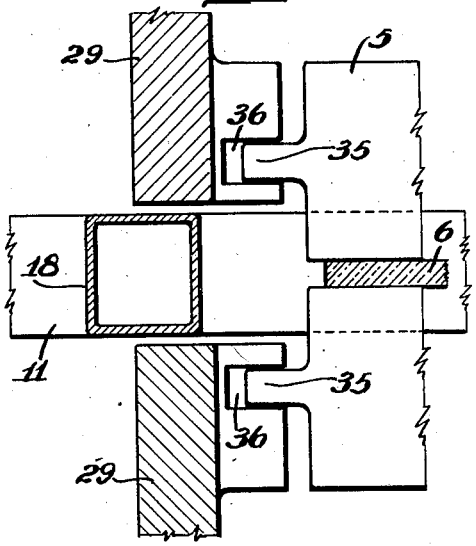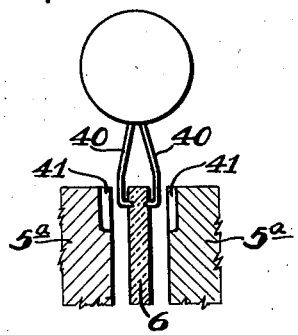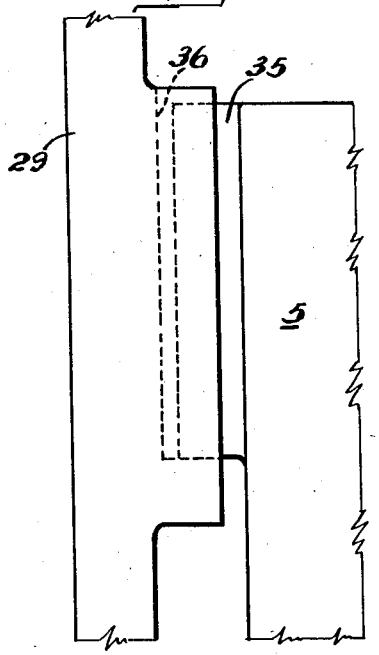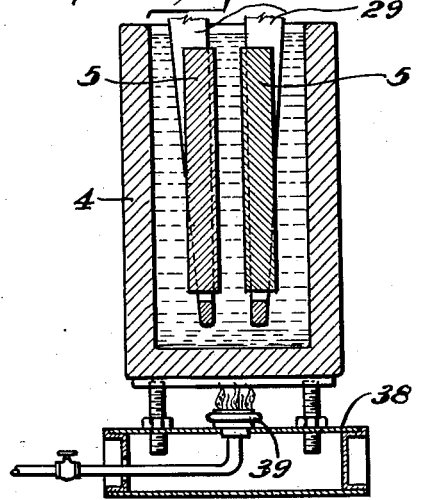

Patented Mar. 7, 1933

1,900,583

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

APPARATUS FOR CASE HARDENING GLASS SHEETS

Application filed March 18, 1932. Serial No. 599,741.

The invention relates to apparatus for case hardening glass sheets so that their strength is greatly increased. The principal objects of the invention are the provision of an improved apparatus of the type employing chilling platens, which permits of a quick application of the platens after the heating operation, in which the removal of the heating device serves to position the cooling platens, which case hardens the glass without modifying its appearance, and which can be operated economically with a limited amount of breakage. Certain embodiments of the invention are illustrated in the accompanying drawings, wherein:

Figure 1 is a section on the line I—I of Fig. 2. Fig. 2 is a section on the line II—II of Fig. 1. Figs. 3 to 7 are enlarged detail views showing means for supporting the glass sheets, Fig. 7 being a section on the line VII—VII of Figs. 3 and 6. Figs. 8, 9, 10, 11 and 12 are other enlarged detail views. Fig. 13 is a section showing a modified tank heating construction. Fig. 14 is an enlarged detail view showing a modified means for suspending the glass sheets.

Referring first to the general arrangement of parts as shown in Figs. 1 and 2, the numeral 1 indicates the heating furnace which is suspended for vertical movement by means of the cable 2; 3 is a framework for supporting the parts and guiding the furnace in its vertical movements; 4 is a tank for regulating the temperature of the platens which are employed to chill the glass sheet after it has been heated in the furnace 1; 5, 5 are a pair of platens for chilling the glass sheet 6 after it has been heated in the furnace 1, such platens being vertically movable with the furnace and adapted to lie on either side of the glass sheet and chill it when the furnace is moved to its upper position; 7, 7 are a pair of screws for moving the platens into contact with the faces of the glass sheet 6 after such platens have been moved up into a position in opposition to such faces; 8 is a cylinder provided with a plunger for moving the cable 2 and thus raising and lowering the furnace 1; 9 is a motor driven pump; 10 is a heat exchanger whereby the liquid in the tank 4 may be brought to any desired temperature; and 11 is a plate or bridge supported in position upon the framework 3 and itself adapted to support the glass sheet 6 just before and during the chilling operation.

The frame members 3 are each made up of a pair of channel bars, as indicated in Fig. 8 and serve as a guide for the four rollers 12, 12 and 13, 13 carried by the furnace, such furnace consisting of a suitable casing 14 of metal carrying the lining 15 of refractory material. Embedded in the lining are the electric heating elements 16, 16 supplied with current from the leads 17, 17. In order to support the glass sheets in the furnace, a framework is provided consisting of the vertical posts 18, 18 and transverse pipe 19, the posts 18, 18 being secured rigidly at their lower ends to the bridge 11. The upper edge of the glass sheet 6 is provided with a plurality of pairs of recesses 20 adapted to be engaged by the clamping fingers 21, 21, as indicated in Fig. 4. The clamping fingers extend through the pipe 19 and are turned at right angles at their upper ends. They are adapted to be moved toward and from each other to engage and release the glass by means of a bar 22. This bar is so constructed that when it is moved in one direction all of the fingers 21, 21 are moved to gripping position and when moved in the other direction they are released. This is accomplished by providing the bar with the wedges 23 and the slots 24 arranged as indicated in Figs. 4 and 5. When the bar 22 is moved in one direction, the wedges 23 are forced between the fingers to separate them and when the bar is moved in the reverse direction, the inclined sides of the slot 24 moved inward toward each other and force the fingers into clamping engagement. This releasing of the glass is necessary at the stage of the operation in which the platens 5, 5 are brought against the surfaces of the glass sheet, and at this time, the fingers are moved to release position and the glass plate drops downward until it rests upon an asbestos strip 25 carried by the bridge 11. This release does not, of course, occur until the furnace is raised to its upper position and the platens have been also raised to their upper position, at which time they are in opposition to the faces of the glass sheet. In those cases in which the glass sheet is of relatively small width in a vertical direction, it is necessary to have a member similar to the member 25 but which extends well up into the chamber of the heater and in that case, it is desirable to steady the side edges of this member. This is accomplished by means of the clips 26 supported in the posts 18, 18, as indicated in Figs. 6 and 7. These clips have a slot at one side to engage the edge of the member which takes the place of the member 25 and at their other edges fit into keyhole slots 27 in the posts. This permits the clips to be readily positioned and removed.

When the parts are in the position indicated in Figs. 1 and 2, the bridge 11 serves as a closure or seal for the slot at the bottom of the furnace. At such time, edge closures are provided in the form of the flap members 28 (Figs. 1 and 9) preferably of asbestos secured to the lower edges of the oven walls and resting against the outer sides of the posts 18. The platens 5, 5 are supported by a pair of depending arms 29, 29 provided at their upper ends with flanges 30, 30 through which extend the right and left hand screws 7, 7. These screws at their central portions form the journals of the guide rolls 13, 13. Extending transversely of the ends of the furnace and secured rigidly thereto are a pair of brackets 31 provided with the flanges 32 at their ends. The screws 7, 7 are swivelled at their ends in these flanges 32 and carry sprockets 33. Chains 34 extend around each pair of sprocket wheels and by moving the chains back and forth the arms 29, 29 may be moved toward and from each other since the screws extend through the flanges 30, 30 of such arms. This serves as a means for bringing the platens into direct contact with the faces of the glass sheet after the furnace and platens have been moved to their upper positions, at which time the platens lie in opposition to the faces of the glass sheet and closely adjacent thereto.

The platens 5, 5, which are preferably of cast iron, are mounted removably in the arms 29, 29, as indicated in Figs. 10 and 11. As here indicated, the platens are provided at their upper and lower ends with pairs of laterally projecting lugs 35, which engage slots 36 on the inner sides of the arms. The platens fit relatively loosely in the slots in order to leave room for expansion and contraction of the platens in all directions. They are preferably made of cast iron, although any other suitable metal may be employed. In order to eliminate any warping tendency due to their contact with the hot glass, the front surfaces are scored as indicated in Fig. 12, the scoring being accomplished with a machine tool and extending into the surface of the metal about one-thirty-seconds of an inch.

Since the platens are to make direct contact with the surfaces of the glass plate 6 during the chilling operation, it is necessary that their temperatures should not be too low, otherwise the glass will be broken. Means are, therefore, provided for heating the liquid in the tank 4 as heretofore explained, and the liquid is of a character which will not flash or ignite at a relatively high temperature. The liquid preferably used is a mineral oil from which the volatile constituents have been removed. The temperature at which the liquid is carried will vary but may range as high as 600 or 700 degrees F. The submersion of the platens in the liquid after their contact with the hot glass will tend to maintain the temperature of the liquid in the tank so that the amount of heat applied to the liquid from the heat exchanger after the operation is well under way is not great. As indicated in Figs. 1 and 2, the tank is seated upon four leveling screws 37 carried by the base 38, so that the tank may be adjusted so that its sides lie in vertical planes.

If desired, the tank may be heated externally by a gas burner, as indicated at 39 in Fig. 13, which arrangement is desirable in case the liquid in the bath is a molten metal such as lead. In this case it is desirable that the platens should be of a metal such as cast iron, to which the lead will not adhere. In other respects this construction corresponds throughout to the construction of Figs. 1 and 2 and similar reference numerals are employed.

Fig. 14 illustrates a modified arrangement for supporting the glass plates 6, which are in this case held by the fingers 40, 40 which are yieldingly pressed inward so as to engage recesses cut in the glass adjacent its edge and are mounted fixedly at their upper ends in the bar 41 which corresponds to the bar 19 of the construction of Figs. 1 and 2. In using this type of apparatus, the glass sheet is not allowed to drop onto the plate 25 during the pressing operation, but is held in suspended position throughout the operation. In order to provide clearance for the fingers 40, the recesses 41 are provided at the upper edges of the platens 5a so that the platens can be brought into contact with the faces of the glass sheet.

In operation, the parts are positioned as indicated in Fig. 1, with the glass plate 6 suspended from the bar 19 and the platens 5, 5 immersed in the heated liquid in the tank 4. The parts are left in this position until the plate 6 is heated to a temperature approaching its softening point. Air is then applied to the cylinder 8 causing the plunger therein to move down so that the cable 2 lifts the furnace above the glass sheet and at the same time brings the platens 5, 5 into position on opposite sides of the glass sheet. The release bar 22 is now moved endwise in the pipe 19 to cause the release of the fingers 21, 21 so that the glass sheet drops until its lower edge rests upon the bridge 25. While this is being done, the screws 7 are operated to move the platens 5, 5 inward so that their faces contact with the surfaces of the glass sheet. The parts are kept in this position until the plate is sufficiently cooled, after which the screws 7 are operated to separate the platens. The plate 6 is now removed and a new plate is positioned between the fingers 21, the bar 22 being operated to move the fingers to engaging position. The cylinder 8 is now operated so that the heating chamber and platens move down and again assume the positions shown in Figs. 1 and 2, thus completing the cycle.

What I claim is:

1. In apparatus for case hardening glass sheets, a bridge provided with a frame for supporting a glass sheet in vertical position, a heating furnace open at the bottom mounted to move vertically and arranged in its lower position to fit over said frame, a pair of cooling platens suspended in parallelism below the furnace so as to move up and down therewith and in upper position to lie on opposite sides of said frame, means for raising and lowering the furnace and platens, and means for moving the platens toward and from each other.

2. In apparatus for case hardening glass sheets, a bridge provided with a frame for supporting a glass sheet in vertical position, a heating furnace open at the bottom mounted to move vertically and arranged in its lower position to fit over said frame with the bridge acting as a closure for the bottom of the furnace, a pair of cooling platens suspended in parallelism below the furnace so as to move up and down therewith and in upper position to lie on opposite sides of said frame, means for raising and lowering the furnace and platens, and means for moving the platens toward and from each other.

3. In apparatus for case hardening glass sheets, a bridge provided with a frame for supporting a glass sheet in vertical position, a heating furnace open at the bottom mounted to move vertically and arranged in its lower position to fit over said frame, a pair of cooling platens suspended in parallelism below the furnace so as to move up and down therewith and in upper position to lie on opposite sides of said frame, means for modifying the temperature of the platens when in their lower position, means for raising and lowering the furnace and platens, and means for moving the platens toward and from each other.

4. In apparatus for case hardening glass sheets, a bridge provided with a frame for supporting a glass sheet in vertical position, a heating furnace open at the bottom mounted to move vertically and arranged in its lower position to fit over said frame, a pair of cooling platens suspended in parallelism below the furnace so as to move up and down therewith and in upper position to lie on opposite sides of said frame, means for heating the platens when in their lower position, means for raising and lowering the furnace and platens, and means for moving the platens toward and from each other.

5. In apparatus for case hardening glass sheets, a bridge provided with a frame for supporting a glass sheet in vertical position, a heating furnace open at the bottom mounted to move vertically and arranged in its lower position to fit over said frame, a pair of cooling platens suspended in parallelism below the furnace so as to move up and down therewith and in upper position to lie on opposite sides of said frame, a bath of liquid for receiving the platens when in their lower position, means for heating said bath, means for raising and lowering the furnace and platens, and means for moving the platens toward and from each other.

6. In apparatus for case hardening glass sheets, a bridge provided with a frame for supporting a glass sheet in vertical position, a heating furnace open at the bottom mounted to move vertically and arranged in its lower position to fit over said frame, a pair of cooling platens suspended in parallelism below the furnace so as to move up and down therewith and in upper position to lie on opposite sides of said frame, a bath of metal for receiving the platens when in their lower position, means for heating said bath, means for raising and lowering the furnace and platens, and means for moving the platens toward and from each other.

7. In apparatus for case hardening glass sheets, a bridge provided with a frame for supporting a glass sheet in vertical position, a heating furnace open at the bottom mounted to move vertically and arranged in its lower position to fit over said frame, a pair of cooling platens of cast iron suspended in parallelism below the furnace so as to move up and down therewith and in upper position to lie on opposite sides of said frame, a bath of lead for receiving the platens when in their lower position, means for heating the bath, means for raising and lowering the furnace and platens, and means for moving the platens toward and from each other.

8. In apparatus for case hardening glass sheets, a bridge provided with a frame for supporting a glass sheet in vertical position, a heating furnace open at the bottom mounted to move vertically and arranged in its lower position to fit over said frame, a pair of cooling platens of cast iron suspended in parallelism below the furnace so as to move up and down therewith and in upper position to lie on opposite sides of said frame, a bath of lead for receiving the platens when in their lower position, means for heating the bath, means for raising and lowering the furnace and platens, and means for moving the platens toward and from each other, said platens having their faces grooved so as to divide them into a plurality of sections.

9. Means for chilling glass sheets comprising a pair of metal platens mounted for movement toward each other in parallelism, and means for regulating the temperature of the platens comprising a bath of liquid positioned beneath the platens so that the platens may be immersed by a relative vertical movement of the platens and the bath.

10. Means for chilling glass sheets comprising a pair of metal platens mounted for movement toward each other in parallelism, and means for regulating the temperature of the platens comprising a bath of molten metal positioned beneath the platens so that the platens may be immersed by a relative vertical movement of the platens and the bath.

11. Means for chilling glass sheets comprising a pair of metal platens having their opposing faces scored to divide such faces into a plurality of sections and mounted for movement toward each other in parallelism, and means for regulating the temperature of the platens comprising a bath of liquid positioned beneath the platens so that the platens may be immersed by a relative vertical movement of the platens and the bath.

12. Means for chilling glass sheets comprising a pair of cast iron platens mounted for movement toward and from each other in parallelism, and means for regulating the temperature of the platens comprising a bath of molten lead positioned beneath the platens so that the platens may be immersed by a relative vertical movement of the platens and the bath.

In testimony whereof, I have hereunto subscribed my name this 12th day of March, 1932.

WILLIAM OWEN.